United States Patent [19]
Siefkes

[11] Patent Number: 5,231,968
[45] Date of Patent: Aug. 3, 1993

[54] FOAMED METAL HEAT DEVICE

[76] Inventor: Donald Siefkes, 2754 Charter Blvd., Troy, Mich. 48083

[21] Appl. No.: 920,246

[22] Filed: Jul. 27, 1992

[51] Int. Cl.⁵ ............................................. F02M 31/00
[52] U.S. Cl. .................... 123/549; 123/557; 165/907
[58] Field of Search ............... 123/543, 549, 552, 557; 165/907

[56] References Cited

U.S. PATENT DOCUMENTS

| | | | |
|---|---|---|---|
| 3,616,841 | 11/1971 | Walz | 164/34 |
| 3,946,039 | 3/1976 | Walz | 264/332 |
| 4,212,275 | 7/1980 | Inoue | 123/549 |
| 4,477,715 | 10/1984 | Bell et al. | 123/549 |
| 4,606,320 | 8/1986 | McGee | 123/549 |
| 5,054,458 | 10/1991 | Wechem et al. | 123/549 |
| 5,078,115 | 1/1992 | Yamashita et al. | 123/549 |
| 5,145,001 | 9/1992 | Valenzuela | 165/907 |

FOREIGN PATENT DOCUMENTS 60-294 1/1985 Japan .................................... 165/907

OTHER PUBLICATIONS

"Duocel Aluminum Foam" brochure, Energy Research and Generation, Inc. 900 Stanford Avenue, Oakland, Calif. 94608, (415) 668-9785.

*Primary Examiner*—Noah P. Kamen
*Attorney, Agent, or Firm*—Reising, Ethington, Barnard, Perry & Milton

[57] ABSTRACT

A method and apparatus for preheating combustion fluids such as air, fuel or fuel-air mixtures upstream of a combustion chamber (12) in an internal combustion engine (10). The apparatus generally includes a heat exchanger (18) and an assembly (30) for heating the heat exchanger. The improvement involves the use of reticulated foam metal as the heat exchanger (18) to provide a very high heating surface area (19) for thoroughly heating the fluids as the fluids pass through the reticulated foam metal.

10 Claims, 1 Drawing Sheet

FOAMED METAL HEAT DEVICE

TECHNICAL FIELD

The subject invention relates to internal combustion engines, and more specifically, to devices and methods for preheating combustion fluids such as air, fuel or fuel-air mixture upstream of the combustion chamber.

BACKGROUND OF THE INVENTION

Increasing the vaporization of fuels can greatly improve the efficiency of internal combustion engines. This can also improve the cold-starting characteristics of engines using fuels such as ethanol and diesel fuel. To this end, many different assemblies have been devised for pre-heating either the fuel, the air or the fuel-air mixture upstream of the engine's combustion cylinder. The typical assembly includes some type of heat exchanger for heating the fluid as it passes through, over or around the heat exchanger and some type of heating means for heating the heat exchanger. Ideally, it is desirable to provide a heat exchanger having a very high surface area for heating the fluid thoroughly as the fluid passes the heat exchanger. U.S. Pat. Nos. 5,054,458 to Wechem et al; 5,086,747 to Curhan, 4,212,275 to Inoue and 5,078,115 to Yamashita et al. all disclose heat exchangers which are honeycomb or otherwise porous to provide a high surface area for heating. For example, U.S. Pat. No. 4,212,275 to Inoue discloses a porous ceramic heater having up to 100 open cells per cubic inch. Now, new technologies allow for the heating surface area of heat exchangers to be increased dramatically beyond what is disclosed in the prior art.

SUMMARY OF THE INVENTION AND ADVANTAGES

An internal combustion engine comprises an internal combustion chamber and a fluid passageway disposed upstream of the chamber for conducting combustion fluids such as air, fuel or a fuel-air mixture into the chamber. The assembly also includes heat supplying means for supplying a predetermined amount of heat to the combustion fluids over a predetermined time interval. The assembly is characterized by the heat supplying means including a reticulated foam heat exchanger disposed in the passageway, where the reticulated foam heat exchanger extends across the passageway to conduct heat across the passageway and to present a large heating surface area for thoroughly heating the combustion fluid as it flows through the reticulated foam heat exchanger and past the heating surface area toward the combustion chamber.

Reticulated foam (as disclosed in U.S. Pat. Nos. 3,616,841 and 3,946,039 to Walz) has been sold under the trade name DUOCEL for a number of applications. Until now, reticulated foam has not been adapted for use as a heat exchanger for heating combustion fluids in internal combustion engines. This structure, when comprised of metal, makes an excellent heat exchanger because of its conductivity and its extremely high surface area to volume ratio. Whereas earlier porous heat exchangers had up to 100 open cells per square inch, reticulated foam has up to 15,625 open cells per square inch. The reticulated foam is far more porous and has far more surface area per unit volume (1600 square feet/cubic foot) than heat exchangers having other structures. The pressure drop of fluids flowing through reticulated foam is also quite low, so a piece of the foam can be placed completely across a flow passage such as a fuel line without inhibiting flow. Thus, reticulated foam is ideal as a heat exchanger.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
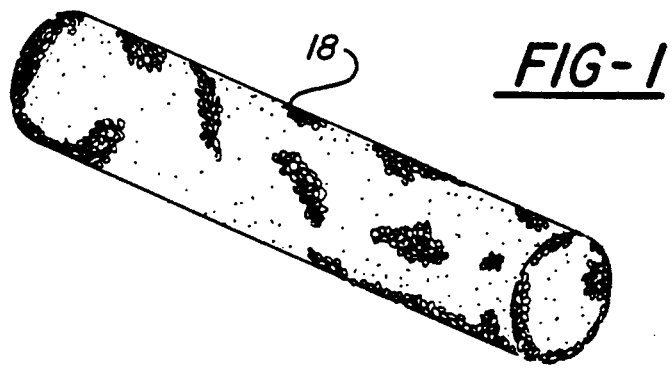
FIG. 1 is a perspective view of a piece of reticulated foam metal.
Figure 2:
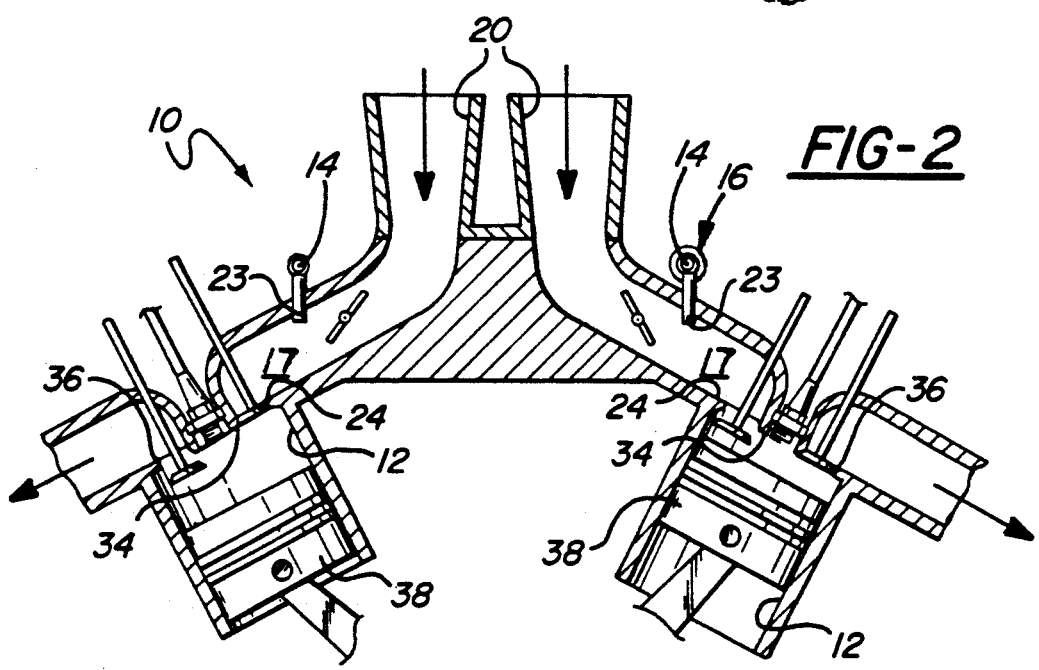
FIG. 2 is a general depiction of an internal combustion engine including the air intake and the fuel line.

Referring to the Figures wherein like numerals indicate like or corresponding parts throughout the several views, an internal combustion engine is generally shown at 10. The engine 10 comprises an internal combustion chamber 12 and a fluid passageway disposed upstream of the chamber for conducting combustion fluids such as air, fuel or a fuel-air mixture into the chamber.

The fluid passageway could be any of the passageways which conduct combustion fluids to the combustion chamber 12 in the engine 10. Thus, the heat exchanger 18 may be placed in the air intake 20 upstream of a point where fuel is mixed with the air; in the fuel line 14 upstream of where the fuel is mixed with the air; or in a mixture passageway 17 downstream of where the fuel mixes with the air and upstream of the combustion chamber 12. In the preferred embodiment, the fluid passageway in which the heat exchanger 18 is placed is the fuel line 14 for supplying fuel to the combustion chamber 12. Fuel ports or fuel injectors 23 atomize fuel from the fuel line 14 into the mixture passageway 17.

The assembly also includes heat supplying means generally indicated at 16 for supplying a predetermined amount of heat to the combustion fluids over a predetermined time interval. The engine 10 is characterized by the heat supplying means 16 including a reticulated foam heat exchanger 18 disposed in the passageway 14, where the reticulated foam heat exchanger 18 extends across the passageway 14 to conduct heat across the passageway 14 and to present a large heating surface area for thoroughly heating the combustion fluid as it flows through the reticulated foam heat exchanger 18 and past the heating surface area toward the combustion chamber 12. Thus, the important feature of the subject invention is the use of a reticulated foam as the heat exchanger 18. Less important are where the heat exchanger 18 is placed upstream of the combustion chamber 12 and how the heat exchanger 18 is heated.

Reticulated foam is also known as reticulated isotropic foam or isotropic open-celled foam. The structure is achieved by making a mold of a piece of organic reticulated foam using investment material such as plaster of Paris. The organic foam is then removed from the mold, and some material such as metal, ceramic, cermet or organic polymer is introduced into the mold. The mold is then dissolved, leaving a piece of metal, etc., in the shape of the original piece of organic foam. This process is disclosed in U.S. Pat. Nos. 3,616,841 and 3,946,039 to Walz, the teachings of which are incorporated herein by reference. This reticulated foam structure has two characteristics which make it an attractive heat exchanger: 1) extremely high surface area per unit volume (1600 square feet/cubic foot); and 2) low resistance to flow of fluids through the structure. The reticulated foam metal heat exchanger 18 can be formed by the manufacturer to have many shapes, sizes and cell sizes. In the present case, the reticulated foam heat exchanger 18 comprises a reticulated foam metal. Preferably, the reticulated foam metal comprises reticulated foam aluminum.

Figure 3:
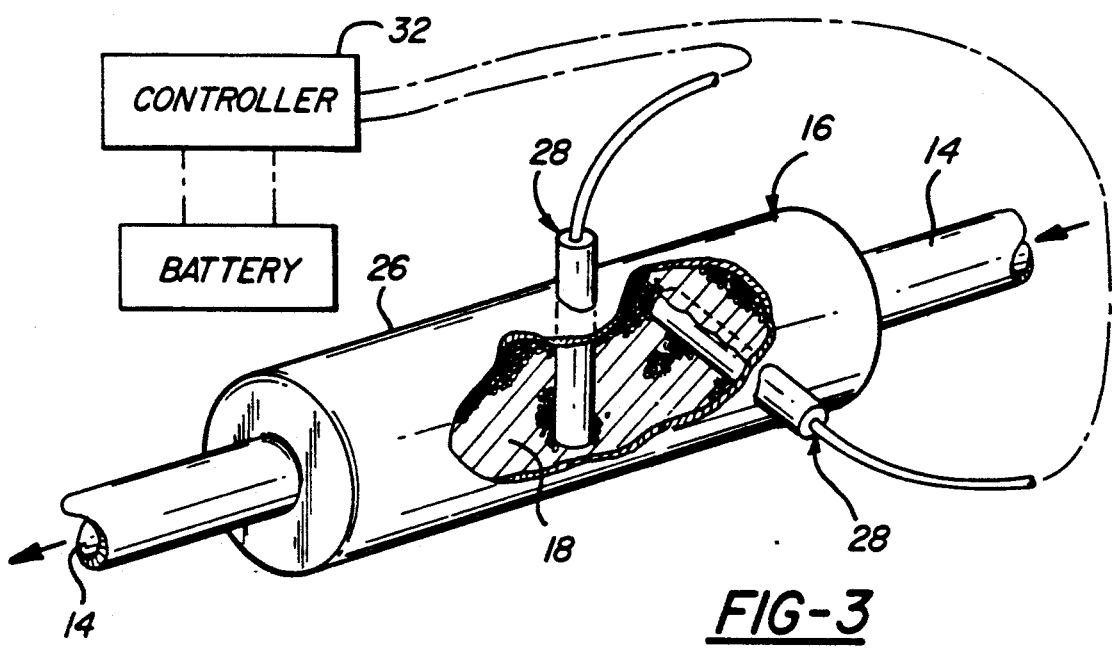
FIG. 3 is a perspective view of the preferred embodiment of the subject invention.

The heat exchanger 18 is placed in this fuel line 14 for heating the fuel before the fuel mixes with the air and becomes vaporized. As shown in FIG. 3 the heat exchanger 18 is disposed in a canister 26 which fits in, or attaches to, the fuel line 14. The canister 26 is ideally constructed to minimize heat loss. To this end the canister 26 is either made from aluminum and surrounded with an insulating jacket, or the canister is made from some insulating, or non heat conducting material which will not be damaged by the fuels passing through it. Such material may be either polyphenylene sulfide or polyoximethylene. The polyphenylene sulfide may be somewhat more desirable because of its ability to withstand higher temperatures.

The heat supplying means 16 includes heating means 28 for heating the heat exchanger 18. As shown in the vast prior art, there are several different ways of heating the heat exchanger. For example, one could use heat from the exhaust gas by conducting an amount of exhaust gas along ducts from the engine exhaust to a heat exchanger. It is also known to heat a heat exchanger with coolant fluid which is itself heated by passing through the engine. In the preferred embodiment, the heating means 28 comprises an electrical resistance heater placed in contact with the heat exchanger 18. The heater 28 is actually a plurality of heating plugs 28 extending through the canister 26 into the piece of reticulated foam metal (for clarity, only two of the heating plugs 28 are shown in FIG. 3). The plugs 28 screw into holes tapped in the canister. A number of holes can be drilled into the foamed metal to accommodate the plugs 28. The plugs 28 are arranged in a crisscross pattern (i.e. ninety degrees apart around the canister 26) as shown in FIG. 3. The plugs 28 are typical resistance wire plugs each having a resistance wire embedded in magnesium oxide and surrounded by a stainless steel jacket. Ten of the plugs 28 are one hundred watt plugs, and nine of the plugs 28 are forty-two watt plugs. Together, the plugs 28 heat the heat exchanger 18 about seventy degrees Fahrenheit above ambient temperature. The plugs 28 are hooked directly to the vehicle's twelve volt battery, and thus the plugs 28 are "on" whenever the ignition of the vehicle is "on". A different number of plugs may be used depending on the size of the heat exchanger 18. In the present case the heat exchanger 18 is roughly in a cylindrical shape (corresponding to the cylindrical shape of the canister 26) and is about four inches in diameter and six inches in length. This size heat exchanger has about seventy square feet of heating surface area. Alternatively, tubes may extend from the engine exhaust to and through the heat exchanger for conducting hot exhaust gas through the heat exchanger before the exhaust gas passes through the catalytic converter and out of the vehicle. Heating with the electric plugs offers the advantage of assisting in cold starting alcohol and diesel fueled engines. Or, these two methods of heating the heat exchanger could be combined: the electric plugs could be turned off once a predetermined engine temperature is reached and the exhaust gas could continue to heat the heat exchanger by itself.

The electrical device was tested on a 1992 Oldsmobile Olds Ninety-Eight having a 3.8 liter V-6 engine. In a controlled test, the device increased the highway gas mileage from 26.8 to 32.5 miles per gallon—a 21.3 percent increase. The device also lowered engine combustion temperature—as evidenced by the fact that the coolant temperature dropped from 195 to 165 degrees Fahrenheit. This indicates that the engine is burning cleaner and exhausting fewer pollutants, especially NOX's.

The assembly may include control means 32 for controlling the amount of heat transferred to the reticulated foam heat exchanger 18 and the time interval over which the heat is transferred. Several types of controllers are disclosed in the prior art, e.g., heaters made of ceramic material having positive temperature coefficient characteristics shut off when the temperature reaches a predetermined point. In the present case, a control member per se is not used, although the number of heating plugs 28 used does affect the amount of heat delivered to the heat exchanger 18, and the fact that the plugs 28 are connected to the battery affects the time interval over which the heat is delivered). No one control element or heater is deemed to be ideal at this point.

The internal combustion engine 10 includes an intake means 34 for controlling fluid flow from the fluid passageway 14 to the combustion chamber 12, an exhaust means 36 for controlling the flow of exhaust from the combustion chamber and two relatively moving parts 12,38 defining the combustion chamber 12. The two relatively moving parts are the chamber 12 itself and a piston 38 or its equivalent. The subject invention may be used in an internal combustion engine of this type, or other types, such as rotary engines, e.g., the Wankel.

The corresponding method for pre-heating combustion fluids such as fuel, air or fuel-air mixture in an internal combustion engine 10 in a combustion fluid passageway 14 upstream of a combustion chamber 12 comprises the following steps: a) filling a section of the fluid passageway 14 with a heat conducting reticulated foam heat exchanger 18; b) heating the reticulated foam heat exchanger 18 and thereby conducting heat across the section of the passageway 14; and c) conducting the combustion fluid through the reticulated foam heat exchanger 18 to transfer heat from the reticulated foam heat exchanger 18 to the combustion fluid. In the present case, the canister 26 containing the heat exchanger 18 is in series with the fuel line 14 so that fuel flows along the line 14 and axially through the canister 26 and through the heat exchanger 18. The heating plugs 28 heat the heat exchanger 18 and the heat exchanger delivers heat to the fuel as it passes through. This heated fuel thus vaporizes more fully when it is introduced into the mixture passageway 24 by means of the fuel port or injector 23. And with this more complete vaporization of the fuel comes improved fuel efficiency of the engine 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. An internal combustion engine (10) comprising:
   an internal combustion chamber (12);
   a fluid passageway (14) disposed upstream of said chamber (12) for conducting combustion fluids such as air, fuel, or a fuel-air mixture into said chamber;
   heat supplying means (16) for supplying a predetermined amount of heat to the combustion fluids over a predetermined time interval;
   said heat supplying means (16) including a heat exchanger (18) disposed in said fluid passageway (14) and extending completely across said fluid passageway so that all fluid flowing through said fluid passageway must flow through said heat exchanger;
   characterized by said heat exchanger (18) comprising a highly porous heat conducting reticulated foam structure defining a multiplicity of labyrinthine passages through said heat exchanger for transferring heat to the fluid as the fluid passes through said structure with minimal pressure drop and for increasing turbulence in the fluid as the fluid passes through said structure in order to thoroughly heat the fluid.

2. An internal combustion engine (10) as set forth in claim 1 further characterized by said reticulated foam heat exchanger (18) comprising a reticulated foam metal.

3. An internal combustion engine (10) as set forth in claim 2 further characterized by said reticulated foam metal comprising reticulated foam aluminum.

4. An internal combustion engine (10) as set forth in claim 1 further characterized by said fluid passageway comprising a fuel line (14) for supplying fuel to said combustion chamber (12).

5. An internal combustion engine (10) as set forth in claim 4 further characterized by said reticulated foam heat exchanger (18) being placed in said fuel line (14) to heat fuel passing through said heat exchanger (18).

6. An internal combustion engine (10) as set forth in claim 5 further characterized by including a canister (26) placed in said fuel line (14) for containing said heat exchanger (18) whereby fuel flows through said canister and through said heat exchanger, said canister (26) being made from insulating material for minimizing heat loss from said heat exchanger.

7. An internal combustion engine (10) as set forth in claim further characterized by said heat supplying means (16) including heating means (28) for heating said heat exchanger (18).

8. An internal combustion engine (10) as set forth in claim 7 further characterized by said heating means (28) comprising an electrical resistance heater placed in contact with said heat exchanger (18).

9. An internal combustion engine (10) as set forth in claim further characterized by including control means (32) for controlling the amount of heat transferred to said reticulated foam heat exchanger (18) and the time interval over which the heat is transferred.

10. A method for pre-heating combustion fluids such as fuel, air or fuel-air mixture in an internal combustion engine (10) in a combustion fluid passageway (14) upstream of a combustion chamber (12) comprising the steps of:
    completely filling a section of the fluid passageway (14) with a heat conducting reticulated foam heat exchanger (18) so that all fluid flowing through said section of said fluid passageway must flow through said heat exchanger;
    heating the reticulated foam heat exchanger (18) and thereby conducting heat across the section of the passageway (14); and
    conducting the combustion fluid through the reticulated foam heat exchanger (18) to transfer heat from the reticulated foam heat exchanger to the combustion fluid.

* * * * *

UNITED STATES PATENT AND TRADEMARK OFFICE
CERTIFICATE OF CORRECTION

PATENT NO. : 5,231,968
DATED : August 3, 1993
INVENTOR(S) : Donald Siefkes

It is certified that error appears in the above-identified patent and that said Letters Patent is hereby corrected as shown below:

```
Column 6, line 13, after "claim" insert --1--.
Column 6, line 21, after "claim" insert --1--.
```

Signed and Sealed this

Fifteenth Day of March, 1994

Attest:

BRUCE LEHMAN

Attesting Officer                Commissioner of Patents and Trademarks